June 30, 1936.   G. BURLEIN   2,045,751
BRACKET
Original Filed Oct. 21, 1933
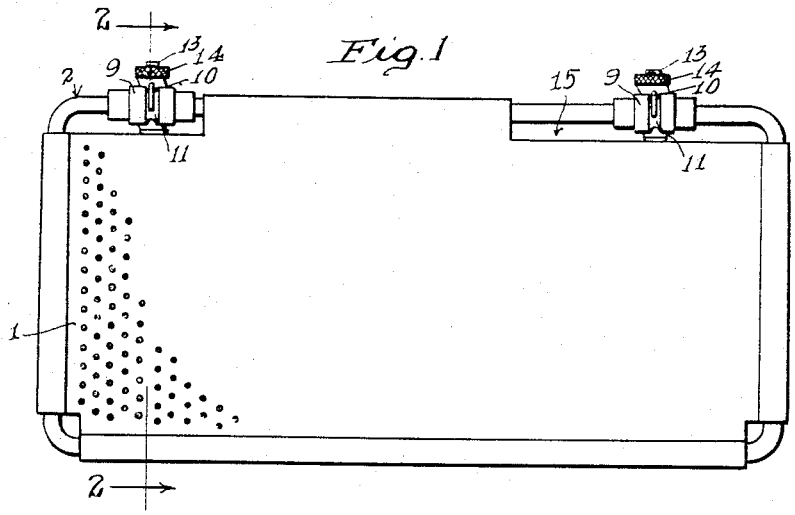
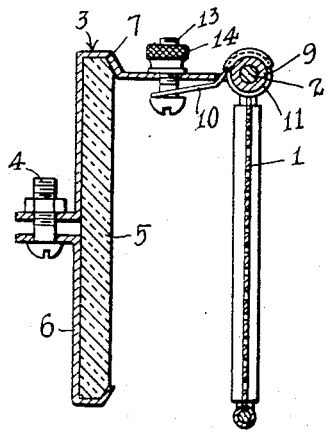
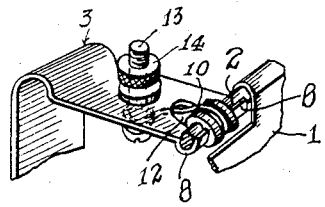
Inventor
Gustave Burlein
By Lyon+Lyon
Attorney Patented June 30, 1936

2,045,751

UNITED STATES PATENT OFFICE 2,045,751

BRACKET

Gustave Burlein, Huntington Park, Calif.

Original application October 21, 1933, Serial No. 694,607. Divided and this application January 4, 1935, Serial No. 381

6 Claims. (Cl. 88—77)

This invention relates to brackets and more particularly to a bracket adapted to be used with a shield to be positioned over the rear view mirror of a motor vehicle for night driving to reduce the intensity of light reflected into the driver's eyes from following vehicles while still permitting the driver to observe the approach of vehicles from the rear.

An object of the invention is to provide a simple bracket construction for supporting a shield or the like in a manner to permit ready adjustment of the shield between various positions.

Other more specific objects and features of the invention will be apparent from the detailed description having reference to the drawing.

This is a division of my application Serial No. 694,607, filed October 21, 1933, entitled "Antiglare shield for rear view mirror", which issued as United States Letters Patent No. 1,990,222 on February 5th, 1935.

In the drawing:

Fig. 1 is an elevation view of a shield and bracket in accordance with the invention;

Fig. 2 is a vertical section in the plane II—II of Fig. 1, showing the shield positioned in front of a rear view mirror; and—

Fig. 3 is a detailed perspective view illustrating the construction of the shield-supporting brackets and hinges.

My shield preferably comprises a perforate metal sheet I dimensioned substantially the same as a rear view mirror with which it is to be used and supported at its outer edges on a wire frame 2. The sheet I is preferably secured to the wire 2 by rolling the edges of the sheet around the wire, as shown in Fig. 2, although if desired the sheet may be welded or soldered to the wire or secured to the wire in any other desired manner.

The wire frame 2 is adapted to be supported from a rear view mirror by a pair of bracket members 3 secured to the mirror with which the shield is to be used. Thus, as shown in Fig. 2, each bracket member 3 may extend down over the rear surface of the mirror 5 and be joined by a bolt 4 to a cooperating bracket member 6 which extends to the bottom of the mirror and is hooked around the lower edge of the mirror. Each bracket member 3 may also be bent downwardly as shown at point 7 to engage the upper edge of the mirror.

From point 7 the brackets 3 are extended forwardly a short distance from the face of the mirror 5 and are split and the ends curved to form a pair of seats 8 for engaging and supporting the wire frame member 2 of the shield. A pair of slotted bushings 9 are mounted upon the wire 2 and fit between the pair of seats 8 associated with each bracket 3. To retain the wire 2 in the seats 8 each bracket 3 is provided with a hooked spring member 10, the outer end of which fits in a peripheral groove 11 in the associated bushing 9 and the other end of which extends down through the slot 12 and is curled around a screw 13 which passes upwardly through an aperture provided therefor in the bracket 3 and is provided with a thumb nut 14 on its upper end. The mid portion of each wire 10 rests against the end of the slot 12 through which it passes and may be tensioned by tightening the associated thumb nut 14 to increase the downward pressure of the outer end of the wire against the associated bushing 9 and force the wire 2 against the seats 8.

With the construction described, the wire 2 is free to rotate within the seats 8 and within the bushings 9, its free movement being restricted by the friction introduced as a result of the pressure exerted by the springs 10. By adjusting the thumb nuts 14, a desired amount of friction may be introduced to retain the shield in an upper position above the mirror 5 while at the same time permitting the easy shifting of the device down into the position of use shown in Fig. 2.

To increase the friction, one of the bushings 9 may be rigidly attached to the wire 2 so that it rotates therewith, under which conditions the bushing slides against the spring 10 when the shield is rotated. The other bushing 9 is preferably mounted loosely upon the wire 2 and the portion of the sheet I adjacent thereto cut away, as shown at 15 in Fig. 1, to permit adjustment of that bushing longitudinally along the wire and permit of lateral adjustment of one bracket member 3. This may be necessary if the device is to be used on a relatively short mirror.

Although my invention has been described with reference to a particular form of construction, it is to be understood that many variations may be made from the structure described without departing from the spirit of the invention and the invention is to be limited only as set forth in the appended claims.

I claim:

1. An anti-glare shield for a rear view mirror comprising a sheet of anti-glare material, a wire frame for supporting said shield and bracket means for hingedly supporting said wire frame with respect to a mirror, said bracket means comprising a strip member attachable to the mirror and adapted to extend forwardly therefrom, the forward end of said strip comprising a pair of spaced apart, hooked arms adapted to receive said wire, a bushing on said wire positioned between said arms and spring means extending from said strip and engaging said bushing for retaining said wire against said hooked arms and frictionally resisting rotation of said wire, said bushing being rigidly secured to said wire.

2. In combination, an anti-glare shield, a wire frame member rigidly secured to said shield for supporting the shield, and bracket means for hingedly supporting said wire frame, said bracket means comprising a strip member terminating in a pair of spaced apart, hooked arms providing a seat for said wire, a bushing on said wire positioned between said arms, and spring means anchored to said strip member and extending therefrom into engagement with said bushing, when the wire is seated in said hooked arms, for resiliently retaining said wire against said seat, said spring means being of substantially smaller dimensions than said bushing in the direction of said wire.

3. In combination, an anti-glare shield, a wire frame member rigidly secured to said shield for supporting the shield, and bracket means for hingedly supporting said wire frame, said bracket means comprising a strip member terminating in a pair of spaced apart, hooked arms providing a seat for said wire, a bushing on said wire positioned between said arms, and spring means anchored to said strip member and extending therefrom into engagement with said bushing, when the wire is seated in said hooked arms, for resiliently retaining said wire against said seat, said bushing having a circumferential groove therein, and said spring means comprising a wire adapted to engage in said groove.

4. In combination, an anti-glare shield, a wire frame member rigidly secured to said shield for supporting the shield, and bracket means for hingedly supporting said wire frame, said bracket means comprising a strip member terminating in a pair of spaced apart, hooked arms providing a seat for said wire, a bushing on said wire positioned between said arms, and spring means anchored to said strip member and extending therefrom into engagement with said bushing, when the wire is seated in said hooked arms, for resiliently retaining said wire against said seat, said bushing being affixed to said wire for rotation therewith.

5. In combination, an anti-glare shield, a wire frame member rigidly secured to said shield for supporting the shield, and bracket means for hingedly supporting said wire frame, said bracket means comprising a strip member terminating in a pair of spaced apart, hooked arms providing a seat for said wire, and spring means anchored to said strip member and extending therefrom into engagement with said wire, when the latter is seated in said hooked arms, for resiliently retaining said wire against said seat, said spring means comprising a piece of spring wire having an eye at one end, a bolt extending through an aperture provided therefor in said strip member and also passing through said eye, said spring wire extending from said bolt along the under side of said strip member, thence between said two spaced-apart arms and above said wire, and being fulcrumed against the end of the slot in said strip member defined by said spaced apart arm portions and the main portion of said strip member, whereby said spring wire may be tensioned by tightening said bolt.

6. In combination, an anti-glare shield, a wire frame member rigidly secured to said shield for supporting the shield, and bracket means for hingedly supporting said wire frame, said bracket means comprising a strip member terminating in a pair of spaced apart arms curved to provide a seat for said wire, and spring means anchored to said strip member and extending therefrom into engagement with said wire when the latter is seated in said curved arms for forcing said wire against said seat, said spring means comprising a resilient member extending from a point on said wire along the under side of said strip member, and being fulcrumed against the end of the slot in said strip member defined by said spaced apart arm portions and the main portion of said strip member, and means for securing the other end of said resilient member to said strip on the under side thereof to maintain the first mentioned end of said member firmly against said wire.

GUSTAVE BURLEIN.